(12) United States Patent
Wigdor et al.

(10) Patent No.: US 10,972,680 B2
(45) Date of Patent: Apr. 6, 2021

(54) THEME-BASED AUGMENTATION OF PHOTOREPRESENTATIVE VIEW

(75) Inventors: Daniel J. Wigdor, Littleton, MA (US); Megan Tedesco, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/044,895

(22) Filed: Mar. 10, 2011

(65) Prior Publication Data
US 2012/0229508 A1  Sep. 13, 2012

(51) Int. Cl.
*G09G 5/00* (2006.01)
*H04N 5/262* (2006.01)
*G06T 19/00* (2011.01)
*G06F 3/147* (2006.01)

(52) U.S. Cl.
CPC ............ *H04N 5/262* (2013.01); *G06F 3/147* (2013.01); *G06T 19/006* (2013.01)

(58) Field of Classification Search
CPC ....... G06T 19/006; G06T 19/20; H04N 5/232; G06F 3/147
USPC ............ 345/629, 419–420, 632–633, 8, 158, 345/632–633, 7, 418, 619, 634; 348/239, 348/42, 46, 47; 715/780; 382/190
See application file for complete search history.

(56) References Cited

U.S. PATENT DOCUMENTS

| | | | | |
|---|---|---|---|---|
| 5,870,136 A | * | 2/1999 | Fuchs et al. | ..................... 348/42 |
| 6,917,370 B2 | * | 7/2005 | Benton | ......................... 345/633 |
| 6,930,715 B1 | * | 8/2005 | Mower | ......................... 348/239 |
| 7,295,697 B1 | | 11/2007 | Satoh | |

(Continued)

FOREIGN PATENT DOCUMENTS

| | | |
|---|---|---|
| CN | 101465004 A | 6/2009 |
| JP | 2000207575 A | 7/2000 |

(Continued)

OTHER PUBLICATIONS

Fang, Hui et al., "Textureshop: Texture Synthesis as a Photograph Editing Tool", ACM Transactions on Graphics, 2004, p. 1-6.*

(Continued)

*Primary Examiner* — Chante E Harrison
(74) *Attorney, Agent, or Firm* — Alleman Hall Creasman & Tuttle LLP (57) ABSTRACT

On a display configured to provide a photorepresentative view from a user's vantage point of a physical environment in which the user is located, a method is provided comprising receiving, from the user, an input selecting a theme for use in augmenting the photorepresentative view. The method further includes obtaining, optically and in real time, environment information of the physical environment and generating a spatial model of the physical environment based on the environment information. The method further includes identifying, via analysis of the spatial model, one or more features within the spatial model that each corresponds to one or more physical features in the physical environment. The method further includes based on such analysis, displaying, on the display, an augmentation of an identified feature, the augmentation being associated with the theme.

19 Claims, 5 Drawing Sheets

(56) References Cited

U.S. PATENT DOCUMENTS

| | | | |
|---|---|---|---|
| 8,570,320 B2 * | 10/2013 | Izadi | G06T 17/00 345/156 |
| 8,965,460 B1 * | 2/2015 | Rao | G06F 3/005 455/566 |
| 9,703,369 B1 * | 7/2017 | Mullen | G06F 3/01 |
| 2002/0169817 A1 | 11/2002 | Eves et al. | |
| 2005/0081161 A1 * | 4/2005 | MacInnes et al. | 715/764 |
| 2006/0256036 A1 | 11/2006 | Katano et al. | |
| 2009/0167787 A1 | 7/2009 | Bathiche et al. | |
| 2009/0189830 A1 | 7/2009 | Deering et al. | |
| 2009/0189974 A1 | 7/2009 | Deering | |
| 2009/0215536 A1 | 8/2009 | Yee et al. | |
| 2009/0237564 A1 * | 9/2009 | Kikinis et al. | 345/419 |
| 2009/0313285 A1 | 12/2009 | Hronopoulos | |
| 2010/0103075 A1 | 4/2010 | Kalaboukis et al. | |
| 2010/0110069 A1 * | 5/2010 | Yuan | 345/419 |
| 2010/0130296 A1 | 5/2010 | Ackley et al. | |
| 2010/0164990 A1 * | 7/2010 | Van Doorn | 345/633 |
| 2010/0208057 A1 * | 8/2010 | Meier | G06T 7/0046 348/135 |
| 2010/0315418 A1 * | 12/2010 | Woo | 345/419 |
| 2011/0138317 A1 * | 6/2011 | Kang et al. | 715/780 |
| 2011/0164163 A1 * | 7/2011 | Bilbrey et al. | 382/190 |
| 2011/0216090 A1 * | 9/2011 | Woo | G06K 9/00 345/633 |
| 2011/0234631 A1 * | 9/2011 | Kim et al. | 345/632 |
| 2011/0292076 A1 * | 12/2011 | Wither et al. | 345/632 |
| 2012/0105473 A1 * | 5/2012 | Bar-Zeev et al. | 345/633 |
| 2012/0113223 A1 * | 5/2012 | Hilliges et al. | 345/420 |
| 2012/0127284 A1 * | 5/2012 | Bar-Zeev et al. | 348/53 |
| 2012/0194517 A1 * | 8/2012 | Izadi et al. | 345/420 |
| 2012/0194547 A1 * | 8/2012 | Johnson | G06T 11/00 345/632 |
| 2012/0194644 A1 * | 8/2012 | Newcombe et al. | 348/46 |
| 2012/0194650 A1 * | 8/2012 | Izadi et al. | 348/47 |
| 2012/0223885 A1 * | 9/2012 | Perez | 345/419 |
| 2012/0231425 A1 * | 9/2012 | Calman et al. | 434/93 |
| 2012/0242865 A1 * | 9/2012 | Vartanian et al. | 348/239 |
| 2013/0044129 A1 * | 2/2013 | Latta et al. | 345/633 |
| 2013/0050260 A1 * | 2/2013 | Reitan | 345/633 |
| 2013/0050432 A1 * | 2/2013 | Perez et al. | 345/633 |
| 2013/0083011 A1 * | 4/2013 | Geisner et al. | 345/419 |
| 2013/0127980 A1 * | 5/2013 | Haddick et al. | 348/14.08 |
| 2014/0051510 A1 * | 2/2014 | Benko | A63F 13/00 463/31 |
| 2014/0240313 A1 * | 8/2014 | Varga | 345/419 |
| 2016/0253842 A1 * | 9/2016 | Shapira | G02B 27/017 345/633 |
| 2016/0267720 A1 * | 9/2016 | Mandella | G06T 19/006 |

FOREIGN PATENT DOCUMENTS

| | | |
|---|---|---|
| JP | 2000276613 A | 10/2000 |
| JP | 2006318095 A | 11/2006 |
| JP | 2009014415 A | 1/2009 |
| JP | 2009076060 A | 4/2009 |
| JP | 2009195707 A | 9/2009 |
| JP | 2009281895 A | 12/2009 |
| KR | 1020050061857 A | 6/2005 |
| KR | 20070050053 A | 5/2007 |
| KR | 100912264 B1 | 8/2009 |
| KR | 20100081725 A | 7/2010 |
| KR | 1020100090401 A | 8/2010 |
| KR | 1020110012523 A | 2/2011 |
| KR | 20140007427 A | 1/2014 |
| TW | 201106085 A | 2/2011 |
| WO | 2007114313 A1 | 10/2007 |

OTHER PUBLICATIONS

Nagao, Katashi, "Agent Augmented Reality: Agents Integrate the Real World with Cyberspace", Retrieved at<<http://www.nagao. nuie.nagoya-u.ac.jp/papers/pdfs/nagao_ccbook98.pdf>>, Oct. 17, 2005, pp. 1-25.

"The reality of Virtual Re@lity", Retrieved at <<http://papers.ssrn. com/sol3/Delivery.cfm/SSRN_ID1473031_code1338919.pdf?abstractid=1473031&mirid=1>>, Apr. 19, 2008, pp. 1-47.

"Future Converged", Retrieved at <<http://www.futureconverged. com/Home/tabid/204/articleType/ArticleView/articleId/495Virtual-World.aspx>>, Oct. 16, 2007, pp. 5.

Mower, E.James, "The augmented scene: integrating the map and the environment",Retrieved at<<http://mapcontext.com/autocarto/proceedings/auto-carto-13/pdf/the-augmented-scene-integrating-the-map-and-the-environment.pdf>>, Retrieved date Nov. 25, 2010, pp. 42-51.

"International Search Report", Mailed Date: Oct. 10, 2012, Application No. PCT/US2012/027787, Filed Date: Mar. 5, 2012, pp. 9.

ISA European Patent Office, Supplementary Search Report Issued in European Patent Application No. 12754739.6, dated Jul. 15, 2014, Germany, 3 Pages.

European Patent Office, Office Action Issued in European Patent Application No. 12754739.6, Jul. 23, 2014, Germany, 6 pp.

The State Intellectual Property Office of China, First Office Action and Search Report Issued in Chinese Patent Application No. 201210060159.3, dated Dec. 1, 2015, China, 12 pages.

Taiwan Intellectual Property Office, Office Action and Search Report Issued in Taiwan Patent Application No. 101106393, dated Dec. 16, 2015, Taiwan, 11 pages (Submitted with translation of Search Report).

Satoh, K., "Shape Measurement," Image Information Media Journal, vol. 56, No. 4, Apr. 1, 2002, 6 pages. (See NPL 3, Office Action Issued in Japanese Patent Application No. 2013557791 for English Explanation of Relevance).

Yokokohji, Y., "Application of Augmented Reality Techniques to Image Overlay and Car Navigation System," Image Information Industrial, vol. 35, No. 7, Jul. 1, 2003, 8 pages. (See NPL 3, Office Action Issued in Japanese Patent Application No. 2013557791 for English Explanation of Relevance).

Japanese Patent Office, Office Action Issued in Japanese Patent Application No. 2013557791, Jan. 4, 2016, 10 pp.. X.

Taiwan Intellectual Property Office, Notice of Allowance Issued in Taiwan Patent Application No. 101106393, dated Sep. 14, 2016, 4 Pages.

Taiwan Intellectual Property Office, Office Action and Search Report Issued in Taiwan Patent Application No. 101106393, dated May 6, 2016, 9 Pages. (Submitted with Translation of Search Report).

The State Intellectual Property Office of China, Office Action Issued in Chinese Patent Application No. 201210060159.3, dated Dec. 5, 2016, China, 7 pages. (Submitted with partial English translation of Decision on Rejection).

"Office Action Issued in Korean Patent Application No. 10-2013-7023809", dated Nov. 3, 2017, 9 Pages.

"Notice of Allowance Issued in Korean Patent Application No. 10-2013-7023809", dated Dec. 19, 2018, 6 Pages.

Office Action Issued in Korean Patent Application No. 10-2013-7023809, dated May 29, 2018, 4 Pages.

* cited by examiner

THEME-BASED AUGMENTATION OF PHOTOREPRESENTATIVE VIEW

BACKGROUND

Virtual reality systems exist for simulating virtual environments within which a user may be immersed. Displays such as head-up displays, head-mounted displays, etc. may be utilized to display the virtual environment. It may be desirable to provide a user with a virtual reality experience wherein the user is not fully immersed, but rather remains somewhat connected to the real environment. Thus, augmented reality systems are being developed to augment the user's perception of a real-world environment with graphics, sounds, etc. As an example, augmented reality systems may be used to provide cockpit simulation environments integrating real objects with virtual imagery for pilot training and simulations. Existing augmented reality technologies typically rely on predetermined data, such as a preconfigured model of the simulation environment, etc. so that virtual elements may be integrated appropriately.

SUMMARY

According to one aspect of this disclosure, a user's view of their environment is augmented according to a user-selected theme. In particular, a display provides the user with a photorepresentative view of the user's environment, from the user's vantage point. The display also displays augmentation(s) associated with a user-selected theme, so as to augment the view. The display of such augmentation(s) is based on a spatial model of the physical environment that is generated and analyzed in real time to identify features which may be augmented. Such identified features correspond to physical features in the physical environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments are disclosed herein that relate to providing theme-based augmenting of a photorepresentative view. The photorepresentative view is provided by a display, and is a substantially realistic (e.g., photo-like) representation of the view of a physical environment in which the user is located and from the user's vantage point. Augmenting the user's perception of their environment in such a manner allows for the user to experience a themed view of their environment, while still remaining somewhat connected to the environment itself.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included herein are schematic and generally not drawn to scale. Rather, the various drawing scales, aspect ratios, and numbers of components shown in the figures may be purposely distorted to make certain features or relationships easier to see.

Figure 1A:
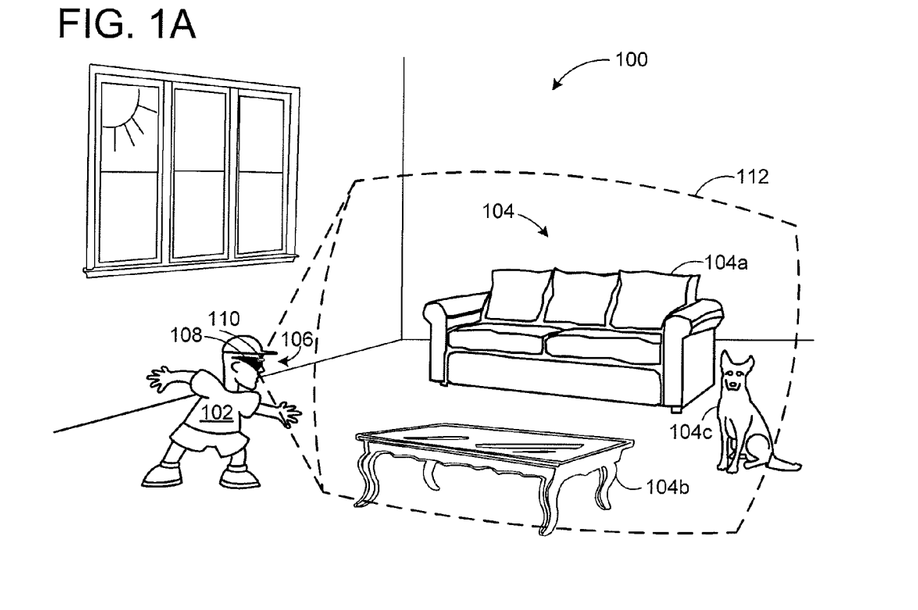
FIG. 1A shows an example use environment in accordance with an embodiment of the present disclosure.

FIG. 1A shows a schematic depiction of an example use environment in accordance with an embodiment of the present disclosure, namely a physical environment 100 in which a user 102 is located. It should be appreciated that FIG. 1A is for illustrative purposes, and is not drawn to scale. Further, although physical environment 100 is depicted in this example as a living room, it should be appreciated that such an environment is illustrative, and thus not intended to be limiting in any way. Rather, physical environment 100 may be virtually any type of physical environment in which user 102 is located, including but not limited to indoor environments, outdoor environments, familiar environments, unfamiliar environments, etc. In addition to user 102, physical environment 100 further includes several physical features 104, including a sofa 104a, a coffee table 104b, and a dog 104c.

FIG. 1A further depicts a display system 106 for providing theme-based augmentation via display output. Display system 106 includes a display 108 configured to provide a photorepresentative view of physical environment 100 from the vantage point of user 102. Nonlimiting examples of display 108 include a head-up display (HUD), a head-mounted display (HMD), etc.

In some embodiments, display 108 may be an optical see-through display having a sufficiently transparent portion or portions. Such a display provides the photorepresentative view via the transparent portion(s) through which the physical environment is visible to the user. However, in other embodiments, display 108 may be an immersive display that is configured to provide the photorepresentative view by displaying a fully rendered image of a spatial model of the environment.

Display system 106 is configured to receive one or more user inputs (e.g., via an input device), including an input selecting a theme for augmenting the photorepresentative view. In response, display system 106 identifies physical features (e.g., objects, people, buildings, etc.) in the environment that may be augmented according to the theme, such as physical features 104, and then displays such augmentations (e.g., while still providing at least some of the photorepresentative view). In this way, user 102 experiences a themed view of physical environment 100, while still remaining somewhat connected to the environment itself.

As an example, display 108 may display images which user 102 perceives as overlaying physical features 104, so as to augment physical environment 100 according to the selected theme. As described in more detail hereafter with reference to FIG. 2, such a display system may utilize an image capture device, such as a depth camera, for obtaining information about physical environment 100, which the display system may utilize to generate a spatial model of the environment. The display system may then analyze the model to identify features within the model which may be augmented.

Figure 1B:
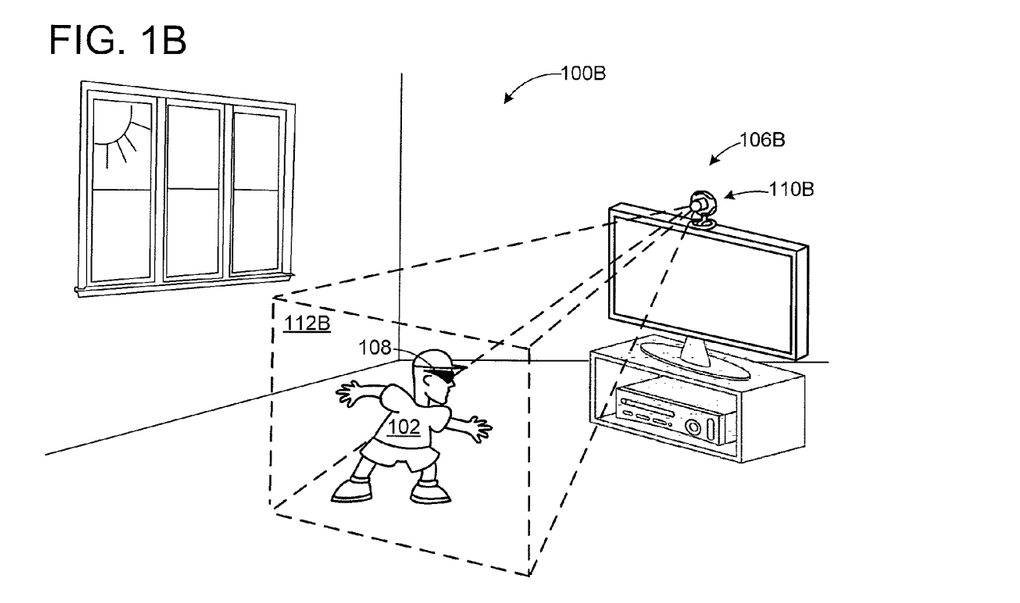
FIG. 1B shows another example use environment in accordance with an embodiment of the present disclosure.

It should be appreciated that display system 106 as illustrated in FIG. 1A is nonlimiting. In other embodiments, one or more components of the display system may be implemented externally so as to provide the photorepresentative view at display 108. FIG. 1B illustrates a schematic depiction of user 102 in another example physical environment, namely physical environment 100B, wherein a display system 106B provides/transmits the photorepresentative view for viewing at display 108. As described in more detail hereafter with reference to FIG. 3, such a display system may utilize an image capture device, such as a depth camera, to track user 102 and the physical environment to generate a spatial model of the physical environment, from the user's vantage point, for example.

Figure 2:
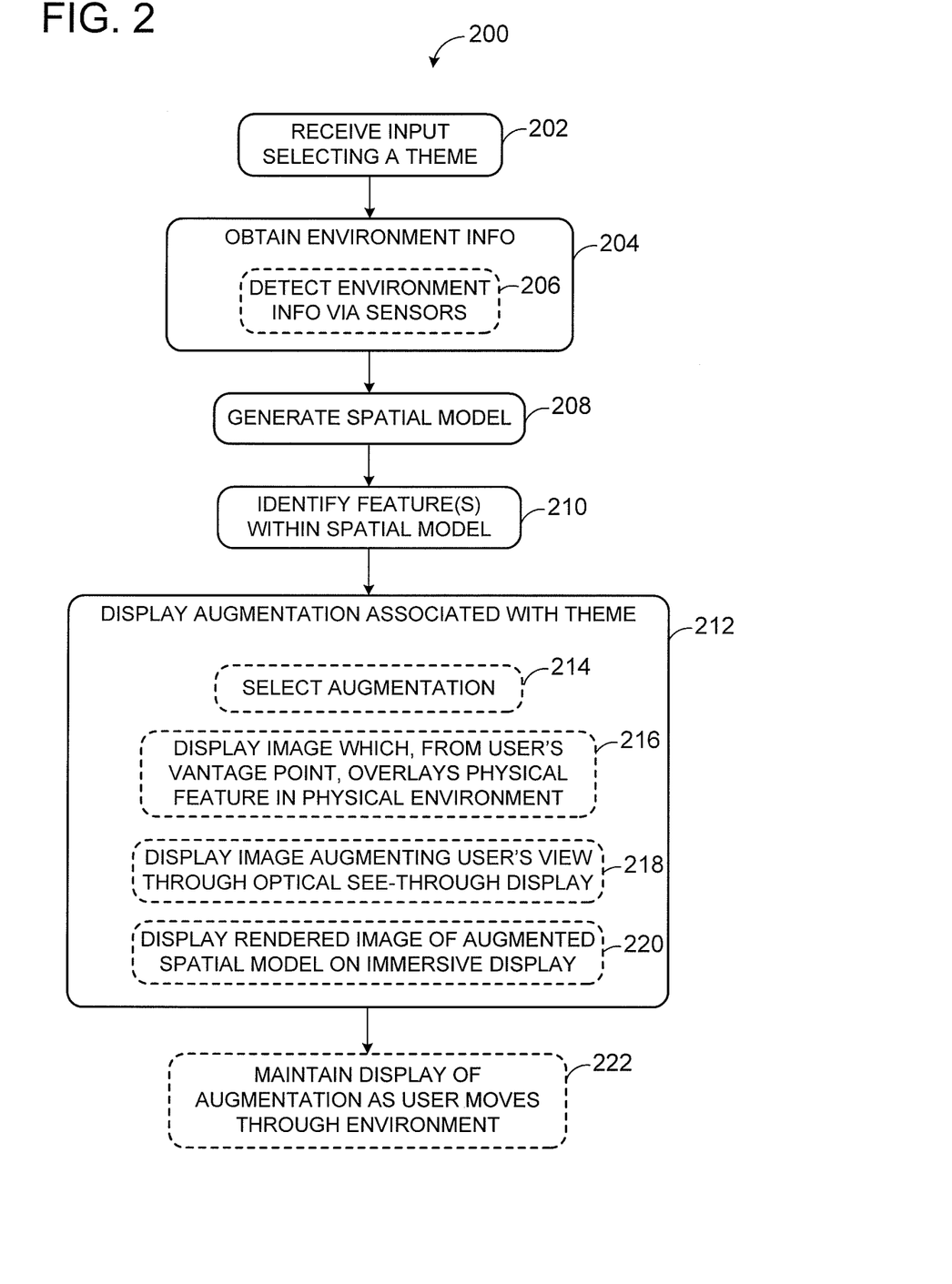
FIG. 2 shows an example method of providing theme-based augmenting of a photorepresentative view in accordance with an embodiment of the present disclosure.

The display system (e.g., display system 106, display system 106B) may be configured to provide theme-based augmentations in any suitable manner. FIG. 2 illustrates an example method 200 of providing theme-based augmenting of a photorepresentative view. Such a method may be provided by the display system (e.g., display system 106, display system 106B) by executing instructions stored thereon, for example.

At 202, method 200 includes receiving, from the user, an input selecting a theme for use in augmenting the photorepresentative view. Such an input may be received from an input device configured to communicate with the display system, such as a user-selectable button, a virtual button or other user interface displayed on the display (e.g., display 108) or at another location, etc.

At 204, method 200 includes obtaining, optically and in real time, environment information of the physical environment. Such environment information may be any suitable information describing the physical environment and features thereof, such as physical features 104 of physical environment 100 illustrated in FIG. 1A. Examples of suitable environment information include, but are not limited to, image data (e.g., color information, depth information, infrared information, etc.), dimension data, surface data, motion data, audio data, etc.

The display system (e.g., display system 106, display system 106B) may be configured to obtain environment information of the physical environment (e.g., physical environment 100, physical environment 100B) in any suitable manner. As a nonlimiting example, the display system may further include one or more sensors configured to obtain such environment information optically and in real time. As such, method 200 may include detecting the environment information via one or more sensors associated with the display, as indicated at 206.

In some embodiments, such sensor(s) may be located proximal to display 108, so as to capture environment information from the vantage point of user 102. FIG. 1A illustrates such an example sensor 110 associated with, and positioned proximal to, display 108. However, as another example, FIG. 1B illustrates an example sensor 110B associated with display 108 yet positioned at a distance from display 108. In the latter case, display system 106B may be configured to determine the vantage point of user 102 based on the detected information. As a nonlimiting example, the sensors may include a capture device, such as a depth camera that visually monitors or tracks an observed scene of the physical environment and features thereof. Among other things, by tracking the position and orientation of user 102, display system 106B can transmit information to display 108 so that it provides a photorepresentative view reflective of the user's current and/or changing vantage point.

At 208, method 200 includes generating a spatial model of the physical environment based on the environment information. Such a spatial model may be any suitable model for representing the physical environment from the user's vantage point, such as a two-dimensional model, a three-dimensional model, etc. The spatial model may include representations of nearly any physical feature or features within the photorepresentative view of the physical environment, from the user's perspective. In particular, the spatial model includes a representation of the physical environment and representations of the objects in the physical environment. The spatial model therefore indicates the spatial positioning of the objects within the environment, and relative positioning to one another. As a nonlimiting example, the spatial model may be a computer-generated model. In addition, the model may be dynamically updated in real time, to account for a changing user vantage point.

Figure 3:
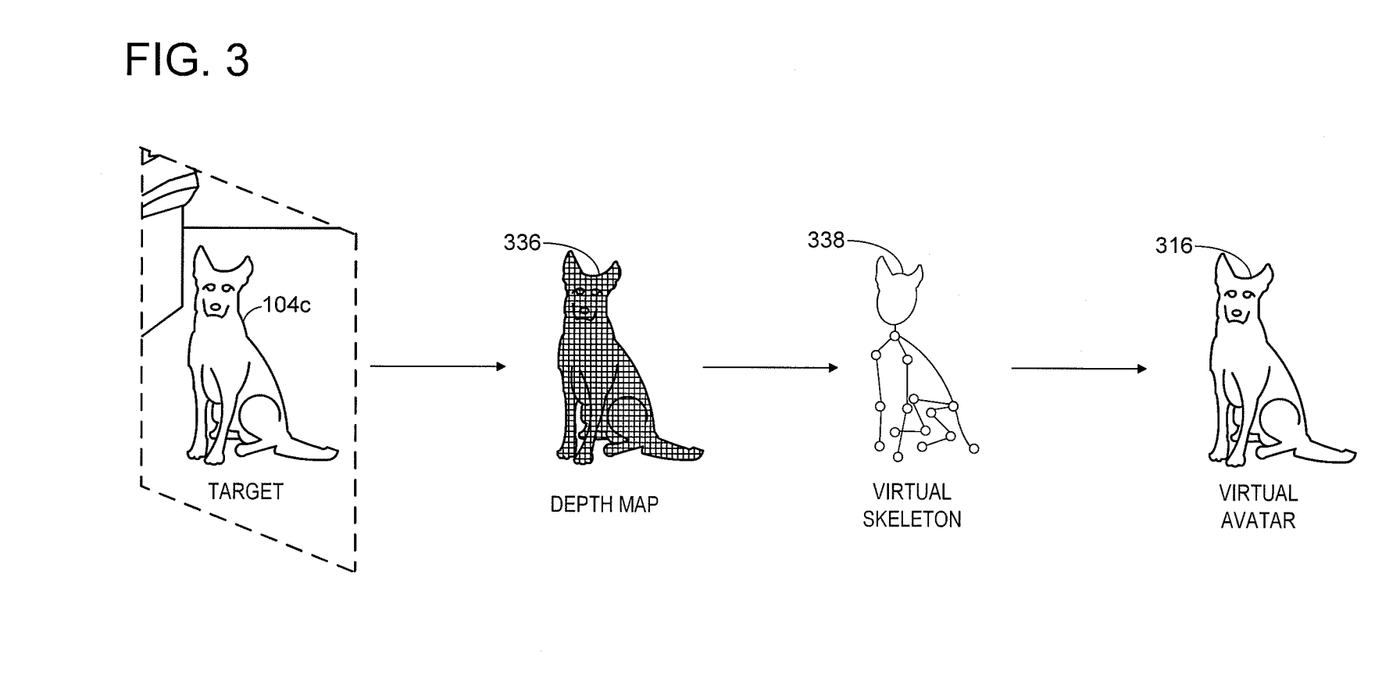
FIG. 3 shows an example schematic depiction of forming a spatial model in accordance with an embodiment of the present disclosure.

FIG. 3 illustrates an example schematic depiction of forming a spatial model for the case of a display system employing depth-image analysis. While FIG. 3 is discussed in more detail hereafter with reference to FIG. 1A, wherein sensor 110 detects an observed scene 112, it should be appreciated that such discussion may also apply to FIG. 1B wherein sensor 110B detects an observed scene 112B. In the former case, sensor 110 is positioned proximal to display 108, and thus the obtained environment information is already from the user's vantage point (e.g., the sensor is aimed as a result of the user's head movement). In the latter case, since sensor 110B is positioned at a distance from display 108, the display system may determine the user's vantage point (e.g., bodily position/orientation, sightline, etc.) from the environment information so as to generate a spatial model of the physical environment from the user's perspective.

Continuing with FIG. 3, the depth-image analysis system of display system 106 may utilize sensor 110 (e.g., a depth camera) to visually monitor or track physical features (e.g., objects, people, etc.) of physical environment 100 within an observed scene 112, as observed by sensor 110. In the depicted example, a physical feature in the form of dog 104c is tracked by sensor 110. It should be appreciated that the illustrated scenario in FIG. 3 is provided as an example, but is not meant to be limiting in any way. To the contrary, the illustrated scenario is intended to demonstrate a general concept, which may be applied to a variety of different applications without departing from the scope of this disclosure. As such, other physical features within observed scene 112 may additionally or alternatively be tracked by sensor 110.

FIG. 3 shows a simplified processing pipeline in which dog 104c in an observed scene 112 is modeled as a virtual skeleton 338 that can be used to generate a virtual avatar 316. By modeling each of the physical features within the environment in such a manner, the spatial model of the environment may be generated. Thus, avatars, virtual objects, surfaces, floors, etc. are properly parameterized within the spatial model so as to accurately represent the tracked positioning, orientation, movement, etc. of their physical counterparts, thus yielding a spatial model that provides an accurate representation of the physical environment. It will be appreciated that a processing pipeline may include additional steps and/or alternative steps than those depicted in FIG. 3 without departing from the scope of this disclosure.

As shown in FIG. 3, the simplified processing pipeline begins with the target (e.g., dog 104c) being imaged by a capture device such as sensor 110 (e.g., a depth camera). It should be understood that several targets within the environment, as well as the environment itself (e.g., walls, floors, etc.) may also be imaged. The depth camera may determine, for each pixel, the depth of a surface in the observed scene relative to the depth camera. Virtually any depth-finding technology may be used without departing from the scope of this disclosure. Example depth-finding technologies are discussed in more detail with reference to capture device 518 of FIG. 5.

The depth information determined for each pixel may be used to generate a depth map 336. Such a depth map may take the form of virtually any suitable data structure, including but not limited to a matrix that includes a depth value for each pixel of the observed scene. In FIG. 3, depth map 336 is schematically illustrated as a pixelated grid of the silhouette of the target. This illustration is for simplicity of understanding, not technical accuracy. It is to be understood that a depth map generally includes depth information for all pixels, not just pixels that image the target, and that the perspective of sensor 110 would not result in the silhouette depicted in FIG. 3.

In some embodiments, a virtual skeleton 338 may be derived from depth map 336 to provide a machine readable representation of the target. In other words, a virtual skeleton 338 may be derived from depth map 336 to model the target. The virtual skeleton 338 may be derived from the depth map in any suitable manner. In some embodiments, one or more skeletal fitting algorithms may be applied to the depth map. The present disclosure is compatible with virtually any skeletal modeling techniques.

The virtual skeleton 338 may include a plurality of joints, each joint corresponding to a portion of the target. In FIG. 3, virtual skeleton 338 is illustrated as a multi-joint stick figure. This illustration is for simplicity of understanding, not technical accuracy. Virtual skeletons in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

As shown in FIG. 3, a virtual avatar 316 may be generated. Such an avatar provides a virtual representation of the target within a spatial model corresponding to the environment. More specifically, because virtual skeleton 338 models the tracked target, and virtual avatar 316 is generated based on the virtual skeleton 338, the virtual avatar 316 serves as a digital representation of the target within the spatial model. It should be appreciated that by generating the spatial model in such a way, any portion or portions of the spatial model may optionally be rendered for display. Further, such a spatial model supports augmentations in that the properties of the digital representations within the model may be modified and rendered for display.

It should be appreciated that although the above-described techniques for modeling objects within the physical environment are directed toward modeling a single target, such description is nonlimiting. Thus, several targets may be modeled using the above-described techniques without departing from the scope of this disclosure. Also, as indicated above, physical features other than moving targets may be modeled, such as floors, walls, ceilings, etc.

In this way, by modeling the physical environment and its features, a spatial model of the physical environment may be generated. Since the environment information may be obtained optically, and in real time, not only may the spatial model be generated and/or updated in real time, but further, the spatial model need not rely on preconfigured data. Therefore, unlike traditional simulation environments, the user may utilize such a display system in "new" environments for which the display system has little or no pre-existing knowledge (e.g., preconfigured spatial model, GPS data, etc.). As such, the user may experience theme-based augmentations for a variety of different physical environments, including new environments for which the system has no prior information.

Returning to FIG. 2, upon generating the spatial model, method 200 next includes, at 210, identifying, via analysis of the spatial model, one or more features within the spatial model that each corresponds to one or more physical features in the physical environment. In this way, the display system determines features within the user's view of the environment. Such analysis may include any suitable analysis such as object recognition, gesture recognition, facial recognition, voice recognition, audio recognition, etc. In some cases, such analysis may yield a general description (e.g., indicating the object's dimensions), etc. whereas in other cases such analysis may yield a more detailed description (e.g., indicating the object is a dog, for example).

Continuing with FIG. 2, at 212, method 200 next includes, based on such analysis, displaying on the display (e.g., display 108), one or more augmentations of one or more identified features. In some embodiments, the augmentations may be displayed, for example, while still providing at least some of the photorepresentative view of the physical environment. The augmentation(s) are associated with the theme selected by the user. In some embodiments, the augmentation(s) may be selected from a plurality of augmentations that are associated with the theme, and such selection is based on the features identified within the spatial model, as indicated at 214. For example, if a large object is identified within the spatial model, then an augmentation of a similar order in dimension may be selected from the available augmentations associated with that theme. For example, a relatively large object in a living room such as a couch might result in use of a particular available augmentation within a theme (e.g., a large castle in a medieval theme). Assuming a nature/forest theme, a tall narrow object in the physical environment could be overlaid with a virtual tree.

The displayed augmentation may be virtually any type of virtual imagery augmenting the photorepresentative view provided to the user. As an example, an image may be displayed which, from the user's vantage point, overlays the corresponding physical feature in the physical environment, as indicated at 216. As a nonlimiting example, a virtual skin may be applied to the identified feature within the spatial model, and an image of the virtual skin may be displayed. Since the skin was applied to the feature within the model, the displayed skin will appear, according to the user, to overlay the corresponding physical feature in the environment.

Figure 4:
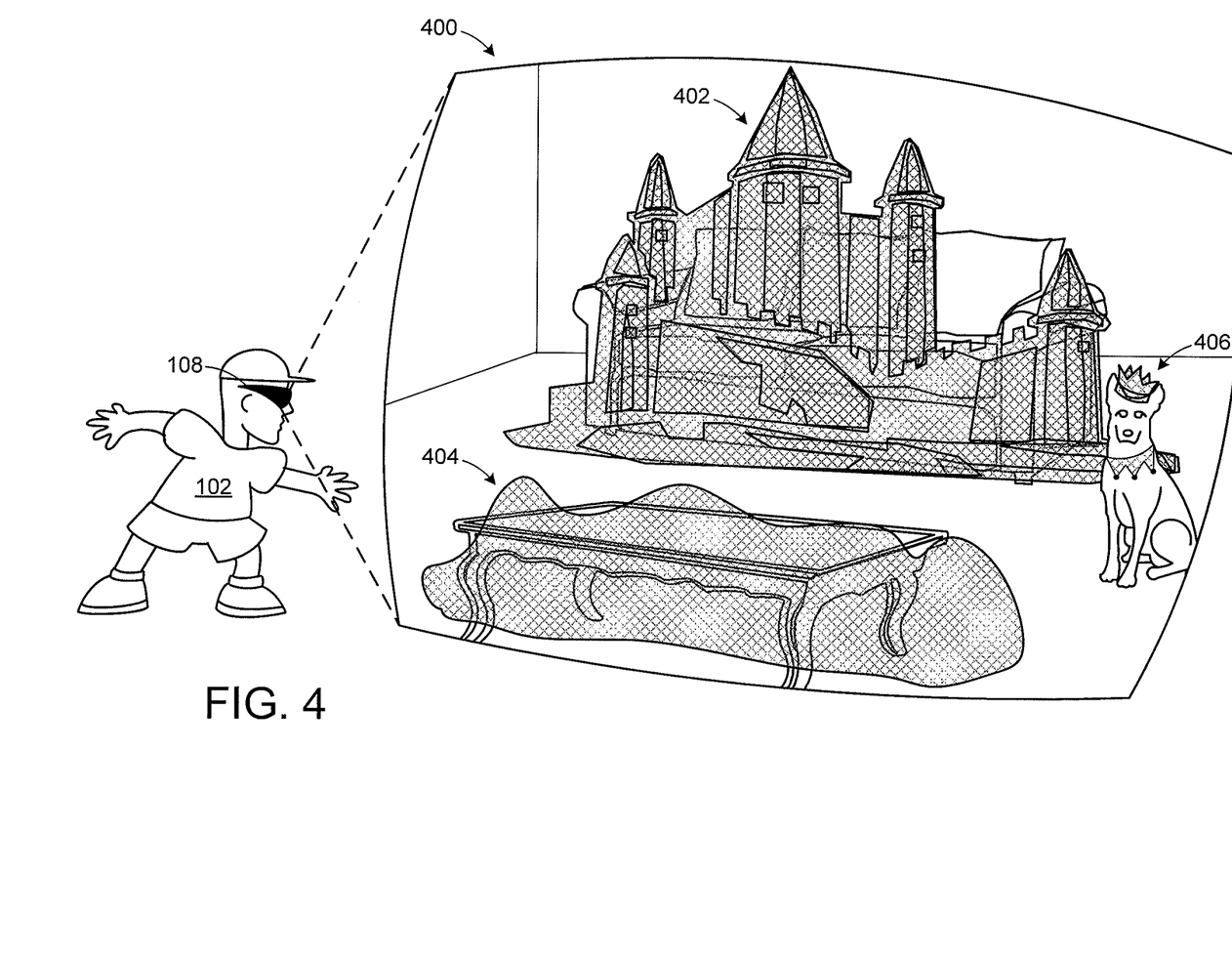
FIG. 4 shows an example theme-based augmentation in accordance with an embodiment of the present disclosure.

FIG. 4 shows an example for user 102 of FIG. 1A, wherein the user has selected a medieval theme. In this example, display system 106 has generated a spatial model of physical environment 100 and identified physical features, namely sofa 104a, coffee table 104b and dog 104c. Based on such analysis, augmentations of the photorepresentative view are displayed at display 108, illustrated in an expanded view at 400. Displaying such augmentations allows the user to see a castle 402 overlaid onto sofa 104a, greenery 404 overlaid onto coffee table 104b, and a costume 406 overlaid onto dog 104c. Since the display of the augmentations is based on analysis of the spatial model, the augmentations are customized for the physical environment. For example, castle 402 may be customized to correspond to the dimensions and features of sofa 104a. Further, since the spatial model may be updated in real time as new environment information is obtained, the display of augmentations may also be updated in real time. Thus, the display of augmentations may be maintained as the user moves through the physical environment, allowing the user to continue with the theme-based experience. As such, display of the augmentations is not "static" in any sense. To the contrary, as the user moves, the display of the augmentations may be dynamically adjusted such that the augmentations continue to be displayed according to the user's dynamically changing vantage point.

It should be appreciated that the illustrated scenario in FIG. 4 is provided as an example, but is not meant to be limiting in any way. To the contrary, the illustrated scenario is intended to demonstrate a general concept, which may be applied to a variety of different applications without departing from the scope of this disclosure.

Continuing with FIG. 2, the augmentation may be displayed in any suitable manner. For example, for the case of an optical see-through display, the user may already be viewing the environment via the photorepresentative view provided by optically transparent portions of the display. In such a case, one or more images of virtual objects may be displayed on the display, which, from the user's vantage point, overlay corresponding physical features in the physical environment. As such, the displayed images augment the user's view, as indicated at 218. In this way, the user is provided with a theme-based experience of their environment, while still remaining somewhat connected to the environment itself.

Alternatively, for the case of an immersive display, the user may already be viewing the environment via the photorepresentative view provided via a fully rendered image of the spatial model (e.g., the entire display is rendered, as opposed to the user directly viewing the scene through optically transparent portions of the display). In such a case, one or more features identified within the spatial model may be modified, and in response, a fully rendered image of the spatial model may be displayed which reflects such modification of the spatial model. Since the features identified within the spatial model may be sufficiently maintained, the user may perceive the modifications as overlaying physical features in the environment, as indicated at 220.

Therefore, regardless of whether the display is an optical see-through display or an immersive display, the user is provided with a theme-based experience of their environment while still remaining somewhat connected to the environment itself. In other words, typically some portion of the displayed content remains photorepresentative, for example, providing an accurate view of the physical environment with a relatively high level of fidelity, such as photo-like. That said, in some cases the entire physical environment may be overlaid, skinned, etc. with appropriate theme-based modifications that are selected in response to the spatial model.

Moreover, since the display system obtains environment information optically and in real time, display of the augmentation may be maintained as the user moves through the physical environment, as indicated at 222. In other words, the augmentation may be dynamically displayed as the user moves within the physical environment to cause consequent change in the photorepresentative view. In some embodiments, this may include modifying the augmentation and/or spatial model such that the displayed augmentation continues to be displayed according to the user's vantage point, even if the user's vantage point is also changing in real time. Therefore, the user may naturally continue the theme-based experience as the user moves through and/or interacts with the environment.

In some embodiments, the above described methods and processes may be tied to a computing system including one or more computers. In particular, the methods and processes described herein may be implemented as a computer application, computer service, computer API, computer library, and/or other computer program product.

Figure 5:
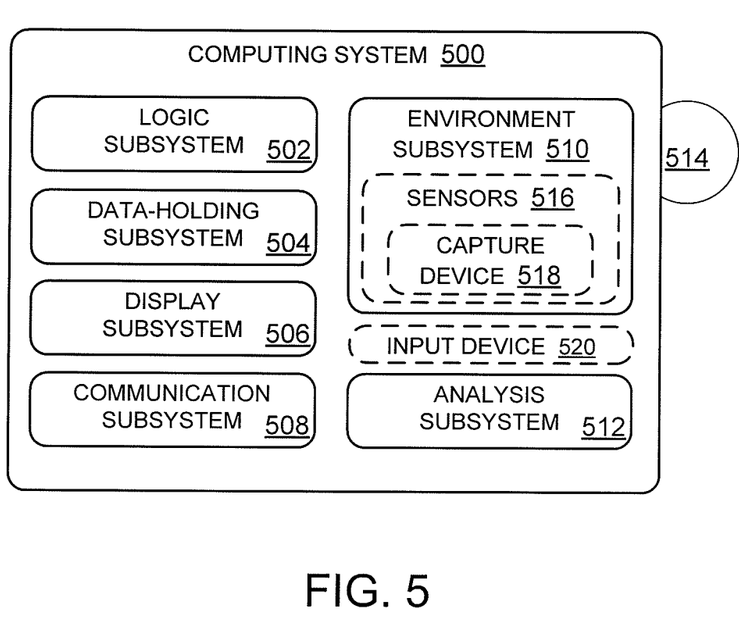
FIG. 5 shows an example computing system in accordance with an embodiment of the present disclosure.

FIG. 5 schematically shows a nonlimiting computing system 500 that may perform one or more of the above described methods and processes. Computing system 500 is shown in simplified form. It is to be understood that virtually any computer architecture may be used without departing from the scope of this disclosure. In different embodiments, computing system 500 may take the form of a mainframe computer, server computer, desktop computer, laptop computer, tablet computer, home entertainment computer, network computing device, mobile computing device, mobile communication device, gaming device, etc.

Computing system 500 includes a logic subsystem 502 and a data-holding subsystem 504. Computing system 500 may optionally include a display subsystem 506, a communication subsystem 508, an environment subsystem 510, an analysis subsystem 512, and/or other components not shown in FIG. 5. Computing system 500 may also optionally include user input devices such as keyboards, mice, game controllers, cameras, microphones, and/or touch screens, for example.

Logic subsystem 502 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 504 may be operatively coupled with the display and one or more sensors (e.g., sensors 516), and may include one or more physical, non-transitory, devices configured to hold data and/or instructions executable by the logic subsystem to implement the herein-described methods and processes. When such methods and processes are implemented, the state of data-holding subsystem 504 may be transformed (e.g., to hold different data).

Data-holding subsystem 504 may include removable media and/or built-in devices. Data-holding subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 504 may include devices with one or more of the following characteristics: volatile, nonvolatile, dynamic, static, read/write, read-only, random access, sequential access, location addressable, file addressable, and content addressable. In some embodiments, logic subsystem 502 and data-holding subsystem 504 may be integrated into one or more common devices, such as an application specific integrated circuit or a system on a chip.

FIG. 5 also shows an aspect of the data-holding subsystem in the form of removable computer-readable storage media 514, which may be used to store and/or transfer data and/or instructions executable to implement the herein described methods and processes. Removable computer-readable storage media 514 may take the form of CDs, DVDs, HD-DVDs, Blu-Ray Discs, EEPROMs, and/or floppy disks, among others.

It is to be appreciated that data-holding subsystem 504 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 506 may be used to present a visual representation of data held by data-holding subsystem 504 (e.g., a virtual avatar and/or a three-dimensional virtual world). As the herein described methods and processes change the data held by the data-holding subsystem, and thus transform the state of the data-holding subsystem, the state of display subsystem 506 may likewise be transformed to visually represent changes in the underlying data. For example, computing system 500 may be configured to render a driving game for display on a display device of display subsystem 506. As such, computing system 500 may include a display output to output the driving game interface to the display device. Display subsystem 506 may include one or more display devices utilizing virtually any type of technology. Such display devices may be combined with logic subsystem 502 and/or data-holding subsystem 504 in a shared enclosure, or such display devices may be peripheral display devices connected to the logic subsystem via a display output.

When included, communication subsystem 508 may be configured to communicatively couple computing system 500 with one or more other computing devices. The communication subsystem may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

Environment subsystem 510 may include one or more sensors 516 for obtaining environment information optically and in real time. Sensors 516 may include an integrated and/or peripheral capture device 518 configured to obtain depth-images of one or more targets. In either case, computing system 500 may include a peripheral input to receive depth images from a depth camera and deliver the received depth images to the logic subsystem for processing. Capture device 518 may be configured to capture video with depth information via any suitable technique (e.g., time-of-flight, structured light, stereo image, etc.). As such, capture device 518 may include a depth camera, a video camera, stereo cameras, and/or other suitable capture devices.

For example, in time-of-flight analysis, the capture device 518 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time, via a technique such as shuttered light pulse imaging.

In another example, structured light analysis may be utilized by capture device 518 to capture depth information. In such an analysis, patterned light (e.g., light displayed as a known pattern such as grid pattern, a stripe pattern, a constellation of dots, etc.) may be projected onto the target. Upon striking the surface of the target, the pattern may become deformed, and this deformation of the pattern may be studied to determine a physical distance from the capture device to a particular location on the target.

In another example, the capture device may include two or more physically separated cameras that view a target from different angles to obtain visual stereo data. In such cases, the visual stereo data may be resolved to generate a depth-image.

In other embodiments, capture device 518 may utilize other technologies to measure and/or calculate depth values. Additionally, capture device 518 may organize the calculated depth information into "Z layers," for example, layers perpendicular to a Z axis extending from the depth camera along its line of sight to the target.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

Environment subsystem 510 may be further configured to generate a spatial model of the physical environment based on the environment information. It is to be understood that at least some target analysis and tracking operations may be executed by a logic machine of one or more capture devices. A capture device may include one or more onboard processing units configured to perform one or more target analysis and/or tracking functions. A capture device may include firmware to facilitate updating such onboard processing logic.

Computing system 500 may optionally include one or more input devices, such as input device 520. Input device 520 may be utilized for receiving a user input selecting a theme for augmenting the photorepresentative view, for example. Input devices may be used to control operation of the computing system. In the context of a game, input devices can be used to control aspects of a game not controlled via the target recognition, tracking, and analysis methods and procedures described herein. In some embodiments, input devices may include one or more of accelerometers, gyroscopes, infrared target/sensor systems, etc., which may be used to measure movement of the controllers in physical space. In some embodiments, the computing system may optionally include and/or utilize input gloves, keyboards, mice, track pads, trackballs, touch screens, buttons, switches, dials, and/or other input devices. As will be appreciated, target recognition, tracking, and analysis may be used to control or augment aspects of a game, or other application, conventionally controlled by an input device, such as a game controller. In some embodiments, the target tracking described herein can be used as a complete replacement to other forms of user input, while in other embodiments such target tracking can be used to complement one or more other forms of user input.

Analysis subsystem 512 may be configured to then analyze the spatial model created by environment subsystem 510. Such analysis may include object recognition, gesture recognition, facial recognition, voice recognition, audio recognition, and/or any other suitable type of analysis.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a see-through display configured to provide a photorepresentative view from a user's vantage point of a physical environment via one or more sufficiently transparent portions of the see-through display through which the physical environment is viewable, a method of providing theme-based augmenting of the photorepresentative view, the method comprising:

receiving, from the user, an input selecting an augmentation theme for use in augmenting the photorepresentative view, the augmentation theme comprising a plurality of possible augmentations and selected from among at least two augmentation themes available for selection;

obtaining, optically and in real time, environment information of the physical environment;

generating in real time a three-dimensional spatial model of the physical environment including representations of objects present in the physical environment based on the environment information;

identifying, via analysis of the three-dimensional spatial model, one or more features within the three-dimensional spatial model that each corresponds to one or more physical features in the physical environment;

based on such analysis, displaying, on the see-through display, an augmentation of a feature of the one or more features identified via analysis of the three-dimensional spatial model, the augmentation being associated with the augmentation theme and being visible while portions of the physical environment remain viewable through the see-through display, the augmentation selected from the plurality of possible augmentations based on one or more of a size and a shape of the feature identified;

as the user moves about the physical environment, updating the three-dimensional spatial model in real time based on the environment information; and as a result of the updating of the three-dimensional model, displaying, on the see-through display, an augmentation change.

2. The method of claim 1, wherein the display is a head-up display.

3. The method of claim 1, wherein the display is a head-mounted display.

4. The method of claim 1, wherein displaying the augmentation comprises displaying an image which, from the user's vantage point, overlays the physical feature in the physical environment corresponding to the identified feature.

5. The method of claim 1, wherein displaying the augmentation comprises applying a virtual skin to the identified feature of the three-dimensional spatial model and displaying an image of the virtual skin which, from the user's vantage point, overlays the corresponding physical feature in the physical environment.

6. The method of claim 1, wherein displaying the augmentation comprises overlaying a virtual object onto the identified feature of the spatial model and displaying an image of the virtual object which, from the user's vantage point, overlays the corresponding physical feature in the physical environment visible to the user through the see-through display.

7. The method of claim 1, wherein obtaining the environment information comprises detecting the environment information via one or more sensors associated with the display.

8. The method of claim 1, wherein identifying, via analysis of the spatial model, one or more features within the spatial model that each corresponds to one or more physical features in the physical environment further comprises performing an object recognition analysis on the spatial model to identify an object in the physical environment.

9. The method of claim 8, wherein the augmentation is selected from the plurality of possible augmentations based on the identified object such that the augmentation is sized to correspond to dimensions and/or features of the identified object.

10. The method of claim 1, wherein displaying the augmentation change comprises displaying a second augmentation associated with the augmentation theme, the second augmentation selected from the plurality of possible augmentations based on an additional feature identified in the spatial model.

11. The method of claim 1, wherein displaying the augmentation change comprises adjusting the displaying of the augmentation as the user moves through the physical environment.

12. A display system for providing augmentation via display output, comprising:
a head-mounted optical see-through display configured to provide a photorepresentative view from a user's vantage point of a physical environment via one or more sufficiently transparent portions of the display through which the physical environment is visible to the user;
one or more integrated sensors configured to obtain, optically and in real time, environment information of the physical environment;
a data-holding subsystem operatively coupled with the display and the one or more integrated sensors, the data-holding subsystem containing instructions executable by a logic subsystem to:
generate a spatial model of the physical environment based on the environment information;
receive a user input selecting an augmentation theme from among at least two augmentation themes available for selection, the augmentation theme comprising a plurality of possible augmentations;
identify, via analysis of the spatial model, one or more features within the spatial model that each corresponds to one or more physical features in the physical environment;
based on the analysis, automatically select an augmentation from the plurality of possible augmentations based on one or more of a size and a shape of an identified feature of the one or more features; and
display, on the head-mounted optical see-through display, the augmentation of the identified feature while simultaneously providing see-through viewing of other portions of the physical environment.

13. The display system of claim 12, wherein the one or more sensors comprise an image capture device configured to obtain one or more depth images of the physical environment.

14. The display system of claim 13, wherein the image capture device includes a time of flight depth camera.

15. The display system of claim 13, wherein the image capture device includes a structured light depth camera.

16. The display system of claim 13, wherein the instructions are executable to generate the spatial model by generating a depth map of the physical environment from the depth images and deriving a machine-readable representation of the physical environment from the depth map.

17. On a head-mounted see-through display, a method of providing theme-based augmentation via display output via one or more sufficiently transparent portions of the head-mounted see-through display through which a physical environment is viewable, the method comprising:
receiving, from a user, an input selecting an augmentation theme from among a at least two augmentation themes available for selection for augmenting a photorepresentative view, the photorepresentative view being from a vantage point of the user and of a physical environment in which the user is located;
detecting, optically and in real time, depth information of the physical environment via one or more depth cameras positioned proximal to the display;
generating a spatial model of the physical environment from a perspective of the user based on the depth information;
identifying, via analysis of the spatial model, one or more features within the spatial model that each corresponds to one or more physical features in the physical environment;
automatically selecting an augmentation from a plurality of augmentations associated with the augmentation theme based on one or more of a size and a shape of an identified feature of the one or more features identified; and
in response, displaying, on the head-mounted see-through display, the augmentation while still providing at least some of the photorepresentative view of the physical environment.

18. The method of claim 17, wherein displaying the augmentation comprises dynamically displaying the augmentation as the user moves within the physical environment to cause consequent change in the photorepresentative view.

19. The head-mounted see-through display of claim 17, wherein selecting an augmentation from a plurality of augmentations associated with the augmentation theme based on one or more of the size and the shape of the identified feature of the one or more features identified further comprises selecting an augmentation sized to correspond to dimensions and/or features of an object located in the physical environment.

* * * * *